US011691081B2

(12) United States Patent
Otomo

(10) Patent No.: US 11,691,081 B2
(45) Date of Patent: Jul. 4, 2023

(54) VIDEO GAME WITH INCREASED REWARD FOR USING OLDER CONTENT

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 17/945,331

(22) Filed: Sep. 15, 2022

(65) Prior Publication Data
US 2023/0020609 A1 Jan. 19, 2023

Related U.S. Application Data

(63) Continuation of application No. PCT/JP2021/009392, filed on Mar. 9, 2021.

(30) Foreign Application Priority Data

Mar. 16, 2020 (JP) .................................. 2020-045076
Mar. 16, 2020 (JP) .................................. 2020-045077
Mar. 16, 2020 (JP) .................................. 2020-045078

(51) Int. Cl.
*A63F 13/60* (2014.01)
*A63F 13/69* (2014.01)
*A63F 13/55* (2014.01)

(52) U.S. Cl.
CPC .............. *A63F 13/60* (2014.09); *A63F 13/69* (2014.09); *A63F 13/55* (2014.09)

(58) Field of Classification Search
CPC ........... A63F 13/55; A63F 13/60; A63F 13/69
See application file for complete search history.

(56) References Cited

U.S. PATENT DOCUMENTS 8,992,330 B1 3/2015 Henrick et al.
2022/0379223 A1* 12/2022 Ding .................... A63F 13/67

FOREIGN PATENT DOCUMENTS

JP 2018-000481 A 1/2018
JP 6544474 B1 7/2019

OTHER PUBLICATIONS

International Search Report issued in corresponding International Application No. PCT/JP2021/009392 dated May 25, 2021 (6 pages).
Written Opinion issued in corresponding International Application No. PCT/JP2021/009392 dated May 12, 2021 (4 pages).

(Continued)

*Primary Examiner* — Corbett B Coburn
(74) *Attorney, Agent, or Firm* — Osha Bergman Watanabe & Burton LLP

(57) ABSTRACT

An information processing device for executing a game in which a new quest can be executed based on an update that adds the new quest to an existing quest, and a new content becomes usable based on an update that adds the new content to an existing content, includes: a decision means for deciding a used content to be used in one quest, which is the existing quest, from contents associated with a player; an execution means for executing the one quest based on a parameter of the used content; and a granting means for granting a reward to the player in response to satisfying a clearance condition in the executed one quest. The granting means prioritizes the reward when a usable time of the used content is earlier than a specific time stored in association with the one quest.

10 Claims, 10 Drawing Sheets

(56) References Cited

OTHER PUBLICATIONS

Notice of Reasons for Refusal issued in corresponding Japanese Application No. 2020-045076 dated Jun. 16, 2020 (8 pages).
Decision to Grant a Patent issued in corresponding Japanese Application No. 2020-045076 dated Sep. 29, 2020 (5 pages).
Weekly Famitsu, Enterbrain Inc., "Monster Hunter Frontier Online Hunters Manual" Xbox 360 No. 4, special appendix 2, Feb. 28, 2011, p. 2-3 (5 pages).
Salt and Sanctuary, Dengeki PlayStation, "Dengeki PlayStation Select Addictive! PlayStation-like casual game selection", Jan. 12, 2017, No. 1/26, vol. 630 (5 pages).

* cited by examiner

Quest E reward

| | |
|---|---|
| Acquired Game Coins | 15600 |
| Acquired Player Experience | 9800 |
| Acquired Free Stones | 5 |

Acquired Characters

| Character V | Character B | Character N |

Because existing character that became usable before March of 2015 was utilized, the number of free stones acquired was increased by 4.

VIDEO GAME WITH INCREASED REWARD FOR USING OLDER CONTENT

BACKGROUND

Technical Field

The present invention relates to instructions and an information processing device for gaming.

Description of the Related Art

Games in which a player acquires characters, items, or other such content in response to the execution of lottery games and quests have been known in the past.

In relation to this, Patent Literature 1 discloses a technique in which a player is allowed to acquire content drawn by lottery by executing a lottery game, or to acquire content by clearing quests executed by using content possessed by the player.

PATENT LITERATURE

Patent Literature 1: Japanese Patent No. 6,544,474

In such games, new quests and updates (version upgrades, etc.) that add new content are performed one after another to keep the player from becoming bored.

However, existing content often has lower parameters, etc., than new content, and the frequency at which such content is used in quests decreases. Furthermore, existing quests often have a lower degree of difficulty than new quests, and such quests are easily cleared by using new content.

SUMMARY

One or more embodiments provide a technological improvement over such conventional gaming devices. In particular, instructions and an information processing device according to one or more embodiments provide a game that can increase the frequency at which existing content is used in existing quests. This provides a practical, technological improvement over conventional gaming devices that would be readily appreciated by those skilled in the art. Further details regarding the various improvements and advantages will become apparent from the descriptions that follow.

According to one or more embodiments, instructions stored in a non-transitory computer-readable recording medium execute a game in which a new quest can be executed based on an update that adds the new quest to existing quests, and new content becomes usable based on an update that adds the new content to existing content, the instructions causing a computer to function as: a decision means for deciding on the used content to be used in one quest, which is an existing quest, from among the content associated with a player; an execution means for executing the one quest based on the parameters of the used content; and a granting means for granting a reward to the player in response to satisfying a clearance condition in the executed one quest, wherein the granting means prioritizes the reward when the used content is existing content that became usable before a specific time corresponding to one quest.

Also, according to one or more embodiments, the decision means decides on a plurality of sets of content as used content from among the content associated with the player, and the granting means prioritizes the reward when some or all of the used content is existing content that became usable before the specific time.

Also, according to one or more embodiments, the decision means decides on a plurality of sets of content as used content from among the content associated with the player, and the more the used content includes existing content that became usable before the specific time, the more the granting means prioritizes the reward.

Also, according to one or more embodiments, the prioritization is for a reward to include new content that became usable after the specific time.

Also, according to one or more embodiments, the prioritization is for the reward to include the right to execute a lottery game in which new content that became usable after the specific time is included in the lottery.

Also, according to one or more embodiments, the prioritization is to strengthen a parameter of the content that is the reward.

Also, according to one or more embodiments, the prioritization is to evolve the content that is the reward.

Also, according to one or more embodiments, the prioritization is to increase the amount of the reward.

Also, according to one or more embodiments, the prioritization is to increase the probability of granting the content that is the reward.

Also, according to one or more embodiments, the reward is existing content that became usable before the specific time.

Also, according to one or more embodiments, the specific time is the time at which a quest was added.

Also, according to one or more embodiments, an information processing device executes a game in which a new quest can be executed based on an update that adds the new quest to existing quests, and new content becomes usable based on an update that adds the new content to existing content, the information processing device comprising: a decision means (a controller) for deciding on the content to be used in one quest, which is an existing quest, from among the content associated with a player; an execution means (the controller) for executing the one quest based on the parameters of the used content; and a granting means (the controller) for granting a reward to the player in response to satisfying a clearance condition in the executed one quest, wherein the granting means prioritizes the reward when the used content is existing content that became usable before a specific time corresponding to one quest.

Configurations of one or more embodiments can increase the frequency at which existing content is used in existing quests.

DETAILED DESCRIPTION

Figure 1:
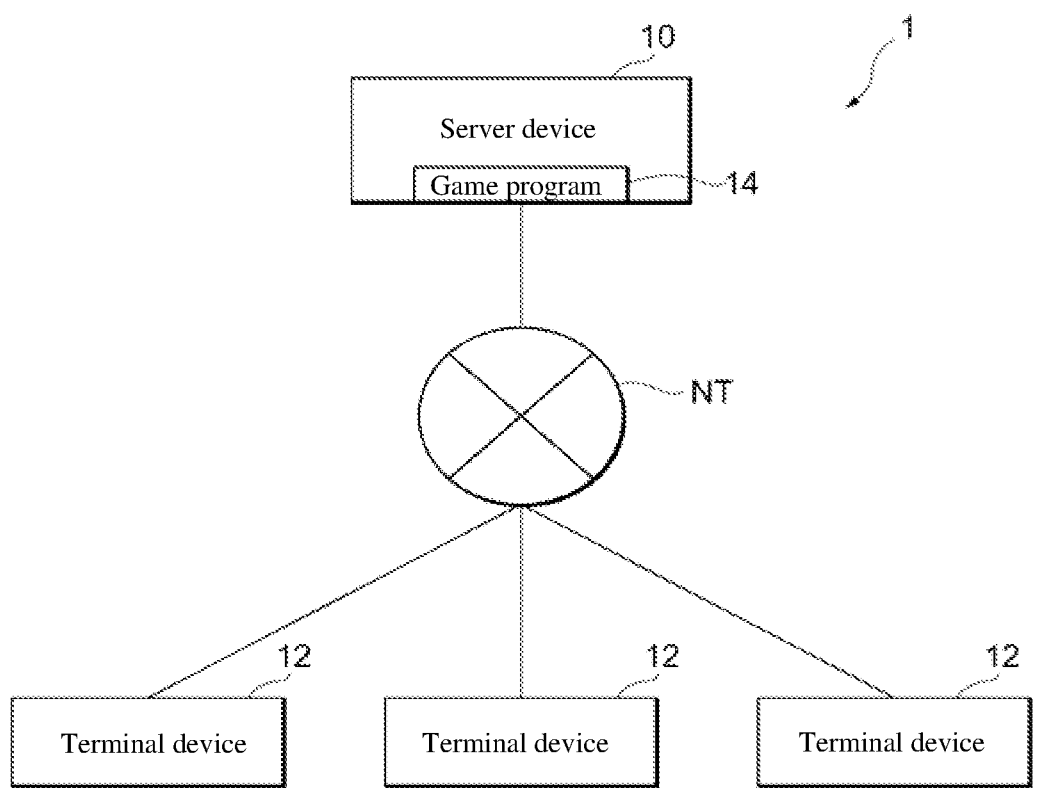
FIG. 1 is a block diagram showing an example of the overall configuration of a game system according to one or more embodiments.

Embodiments of the present invention will now be described with reference to the appended drawings. To facilitate understanding of the description, components and steps that are the same will be numbered the same as much as possible in the drawings, and redundant description will be omitted.

First Example

First, a first example will be described.
Overall Configuration

FIG. 1 is a block diagram showing an example of the overall configuration of a game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing a game program (game instructions) 14, or the game program 14 itself, to the player of each terminal device 12 via the communication network NT. In one or more embodiments, the server device 10 provides the game program 14 itself to the players of the terminal devices 12.

Each terminal device 12 is an information processing device belonging to a player, and is an information processing device that provides a game to a player by executing the game program 14 received from the server device 10 after the program has been installed. Examples of these terminal devices 12 include video game machines, arcade game machines, mobile phones, smartphones, tablets, personal computers, and various other such devices.

Hardware Configuration

Figure 2:
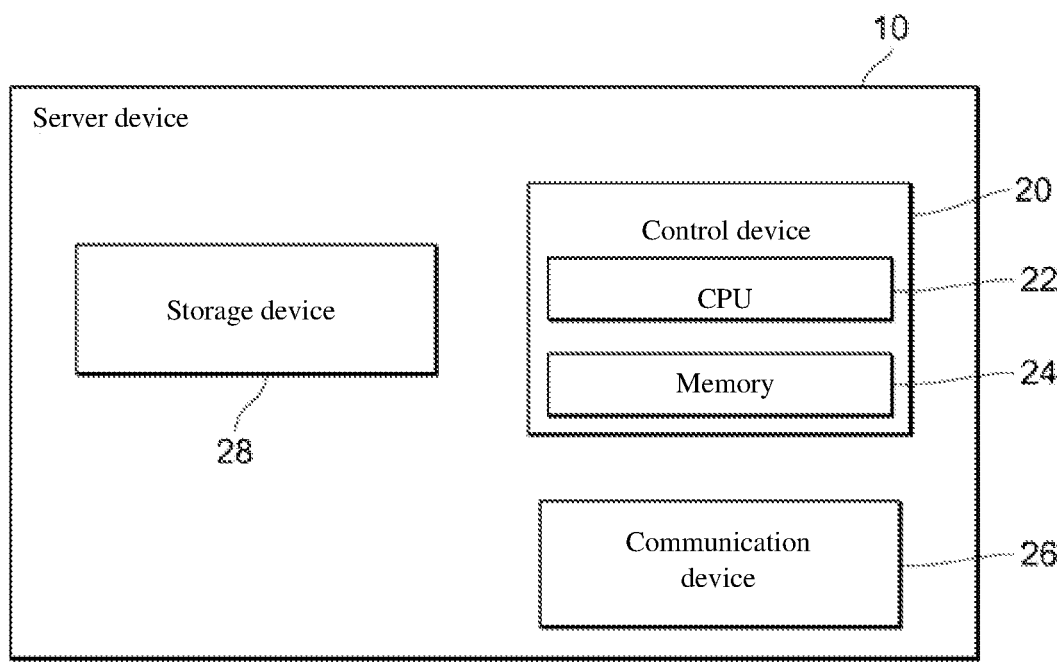
FIG. 2 is a diagram schematically showing an example of the hardware configuration of a server device according to one or more embodiments.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional means by executing specific programs (specific instructions) stored in the memory (including a non-transitory computer-readable recording medium) 24, the storage device 28 (including a non-transitory computer-readable recording medium), or the like. These functional means will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of program (instructions) and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising an operating means, a display device, and a sound output device, for example.

Figure 3:
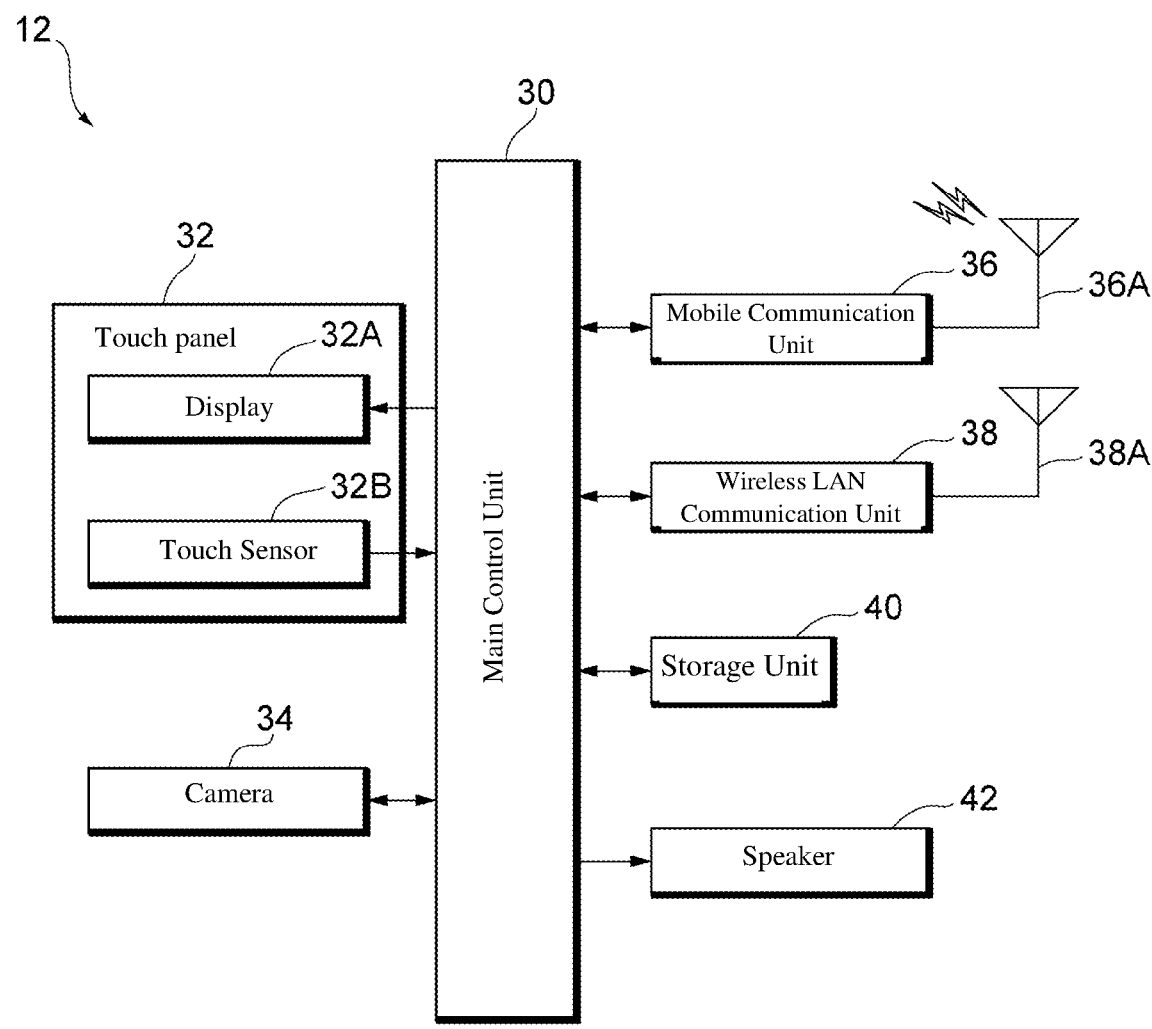
FIG. 3 is a diagram showing an example of the hardware configuration of a smart phone according to one or more embodiments, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of programs (instructions) and data, such as the game program 14, and play data indicating player information or the progress of the game in the game program 14. This play data may be stored in the server device 10.

The speaker 42 has the function of outputting game sounds and so forth.

Game Overview

The game according to one or more embodiments includes a quest or a lottery game in which a player acquires characters, as an example of content. Lottery games are sometimes referred to as gacha (loot box), raffle, summoning, etc. Quests are sometimes referred to as dungeons, subjugations, searches, and the like.

The lottery game according to one or more embodiments can be executed when the player selects a lottery game from among a plurality of types of lottery game on the execution menu screen, etc., of the lottery game. In this lottery game, the player can select a one-time lottery, in which that lottery game is executed once, or continuous lottery, in which that lottery game is executed 10 times in a row. This one-time lottery is sometimes referred to as a single gacha, a one-time raffle, a one-time summoning, or the like. Also, this continuous lottery is sometimes referred to as a ten-in-a-row gacha, a ten-draw raffle, a ten-time summoning, or the like. Then, the player is allowed to acquire a randomly selected character from the lottery target character group (lottery target content group) corresponding to that lottery game, based on an instruction (request) from the player to execute a one-time lottery or a continuous lottery. This lottery game is executed based on the consumption of credit. Examples of this credit include paid-for items (paid items) and free items (unpaid items). A paid-for item is an item that can be acquired by a player through a purchase transaction (payment in cash or electronic money, credit card payment, etc.). Examples of paid-for items include paid-for stones, paid-for gacha tickets, and the like. A free item is an item that can be acquired by the player through game play (execution of various games). Examples of this game play include logging in, clearing quests, completing missions, interacting with other players registered as friends, and so on. Examples of free items include free stones, free gacha tickets, and the like. Paid-for items have more value than free items. For example, in a lottery game that can be executed by consuming only paid-for items, it is easier to acquire a character with a higher rarity (rarity value) than in a lottery game that can be executed by consuming free items. Paid-for stones and free stones are sometimes referred to as "stones" without distinguishing between the two.

Also, the quest according to one or more embodiments is executed when the player selects a quest from among a plurality of types of quest on the quest menu screen. These quests include normal quests and event quests. A normal quest is a quest format in which the next quest can be played when the player clears a playable quest. An event quest is a quest format in which playable quests are switched depending on the time of day or period. Also, each quest is executed based on the fact that a consumption stamina value associated with the quest is consumed from the player's current stamina value. Stamina may also be referred to as life, action points (AP), battle points (BP), or the like. The player's current stamina value may also be consumed at the end of a quest (once the quest is cleared or when the player retires).

In addition, in the quest according to one or more embodiments, a team made up of one of more of the characters possessed by the player executes a battle game involving battle against appearing enemy characters. In this quest, for example, the player instructs the characters forming the team (used characters) to attack, etc. When a quest is cleared, the player acquires (is granted) a reward, such as free items, game coins, characters, or player experience value. If a quest is one that the player has already cleared, it may be that no free items are acquired.

Overview of Update

In the game according to one or more embodiments, updates that add new quests to existing quests, and updates that add new characters (content) to existing characters (content) are performed regularly or irregularly. These updates are sometimes referred to as a version upgrade or the like. Also, this addition is sometimes referred to as release, unbanning, or the like. An "existing quest" refers to a quest added before a predetermined time (such as May of 2019). On the other hand, a "new quest" refers to a quest added after this predetermined time. An "existing character" refers to a character added before the prioritization time (specific time) corresponding to each quest. On the other hand, a "new character" refers to a character added after the prioritization time. This prioritization time is, for example, a time based on when the quest was added (the time when the quest became executable).

In the game according to one or more embodiments, a new quest can be executed based on the update that adds this new quest. In this new quest, for example, the degree of difficulty is set higher than in existing quests, and the parameters for enemy characters that appear are set higher, or there are many gimmicks that are disadvantageous to the player (for example, a damage floor). If a new quest is a normal quest, the player can play the new quest after the update on the condition that all existing normal quests have been cleared. If a new quest is an event quest, the player can play the new quest at a specific time of day or period after the update.

Also, with the game according to one or more embodiments, a new character (content) becomes usable based on an update that adds that new character (content). This new character includes, for example, an evolved character from an existing character. Also, the new character has parameters, or upper limit values of parameters, set higher than those of existing characters, or has skills that are advantageous to gimmicks and enemy characters appearing in new quests. After this update, the player can acquire the new character by executing a lottery game in which the new character is included in the lottery target, or executing a quest (such as a new quest) in which the new character is included in the reward. The player can use the acquired new character in quests, missions, and the like.

Overview of Fusion

The "fusion" according to the one or more embodiments refers to using one of the characters possessed by the player (possessed content) as a fusion source character (fusion source content), and training this one character using the other characters as resource characters (resource content). The resource characters used for fusion are eliminated (deleted) from the characters possessed by the player.

Also, the fusion according to one or more embodiments includes strengthening fusion and evolutionary fusion. Strengthening fusion is fusion in which a parameter (such as level) of the fusion source character is changed. Evolutionary fusion is fusion in which the source character evolves (changes) into another character.

The strengthening fusion according to one or more embodiments can be executed when the player selects the strengthening fusion menu on the management menu screen of a possessed character. In this strengthening fusion, the fusion source character and the resource character are selected from among the characters possessed by the player by a selection operation by the player. For instance, in strengthening fusion, a certain number (such as 20) or less of resource characters are selected for a single fusion source character.

Also, in the strengthening fusion according to one or more embodiments, instead of consuming a selected resource character, a parameter of the selected fusion source character is changed so as to be beneficial for the game (such as a quest). For example, when a resource character of a type different from that of the fusion source character is used to strengthening fusion with a fusion source character, the parameter of that fusion source character increases.

Also, the evolutionary fusion according to one or more embodiments can be executed when the player selects the evolutionary fusion menu on the management menu screen of a possessed character. In this evolutionary fusion, a fusion source character and a resource character are selected from among the characters possessed by the player by means of a selection operation of the fusion source character by the player. For example, in evolutionary fusion, a certain number (such as five) of resource characters that have already been associated with that fusion source character are selected for a single fusion source character.

Also, in the evolutionary fusion according to one or more embodiments, instead of consuming the selected resource character, the selected fusion source character is evolved (changed) into another character. In other words, the fusion source character is associated with the character ID of another character through evolutionary fusion, and the name, image, skill, rarity, etc., of the character change. This fusion source character is called a pre-evolution character. This other character is called an evolved character. In one or more embodiments, an evolved character is set to have a rarity one higher than that of a pre-evolution character, and the upper limit of a parameter is higher than that of the pre-evolution character, for example.

Functional Means

Figure 4:
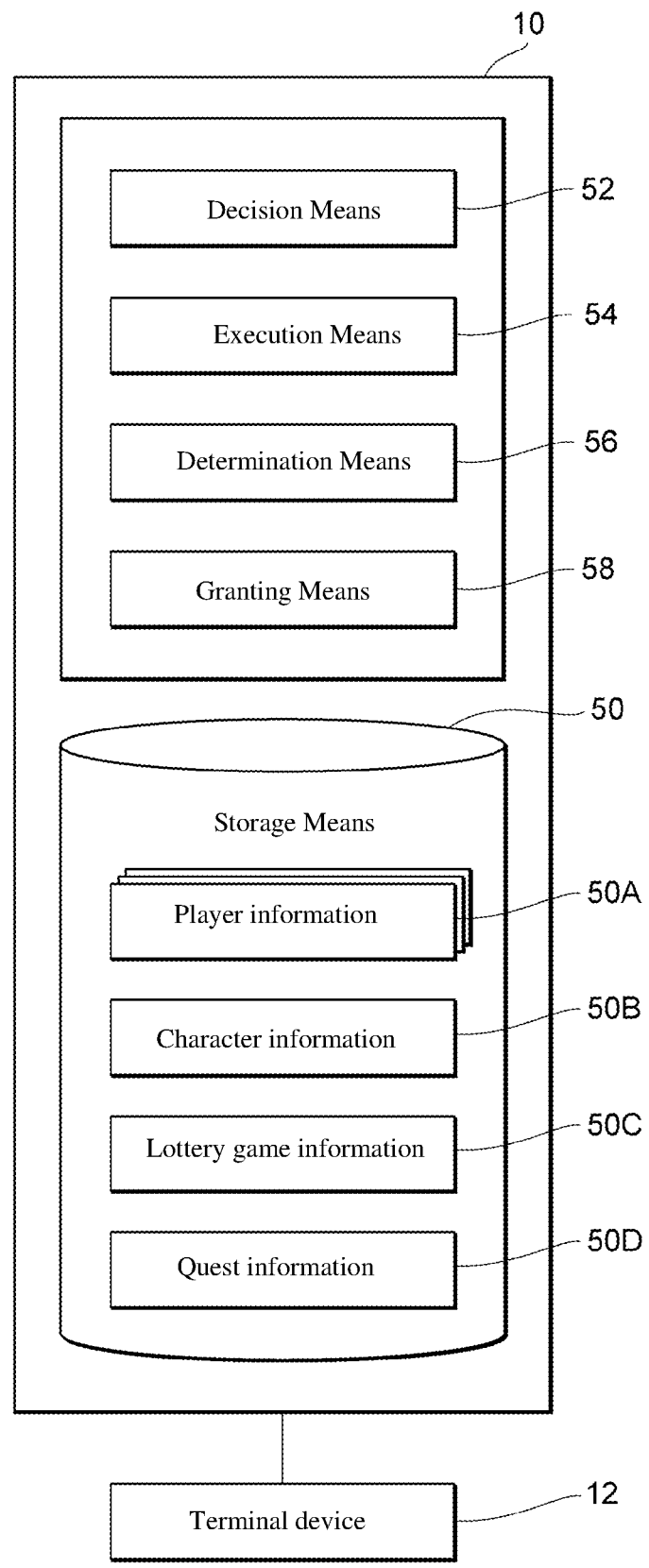
FIG. 4 is a block diagram showing an example of the functional configuration of a server device according to one or more embodiments.

FIG. 4 is a block diagram showing an example of the functional configuration of the server device 10.

As shown in FIG. 4, the server device (including a controller such as CPU 22) 10 comprises, as functional components, a storage means 50, a decision means 52, an execution means 54, a determination means 56, and a granting means 58. The storage means (including a non-transitory computer-readable recording medium) 50 is in the form of one or more storage devices 28. Functional means other than the storage means 50 are realized when the control device 20 execute the game program 14 stored in the storage device 28 or the like.

The storage means 50 is a functional means for storing player information 50A, character information 50B, lottery game information 50C, quest information 50D, and the like.

The player information 50A is stored for each player in association with the player ID for that player. This player information 50A includes, for example, a player's name and age, possessed character information, organization information, possessed item information, stamina information, and friend information. The possessed character information includes the character ID and parameters for each possessed character. Parameters include level, hit points, attack power, defense power, and so forth. The level increases (changes) when a character (fusion source character) acquires character experience value through fusion. As the level increases, the hit points, attack power, defense power, character experience value, etc., also increase. Organization information includes a specific number (such as seven) of teams organized in advance by the player. Each team includes, for example, a specific number (such as three) or less of possessed characters selected in advance by the player. Possessed item information includes the number of possessed items in association with the item ID of each possessed item. Examples of these items include paid-for stones and free stones. Stamina information includes the player's current stamina value and the stamina upper limit value. The current stamina value is the value that will be consumed when the player executes a quest. This current stamina value increases by a specific amount (such as 1) when a certain amount of time has elapsed (such as 3 minutes), and is restored to the stamina upper limit value. Also, the current stamina value is restored to the same amount as the stamina upper limit value when the player consumes paid-for stones, free stones, stamina recovery items, and the like. This stamina upper limit value increases as the player rank of the player goes up. The player rank increases when the player gains player experience value, such as by playing a quest. Friend information includes player IDs of other players registered as friends.

The character information 50B is stored for each character in association with the character ID of that character. This character information 50B includes, for example, the character name or image, rarity, initial values and upper limit values of parameters, skills, and usable time. Rarity includes, for example, a number from 1 to 6. This number may be indicated by the number of stars, for example. For instance, for a character with high rarity, a parameter or the upper limit value of a parameter is set higher. The usable time includes the time at which the character became usable, that is, the time at which that character was added. This time is, for example, the time at which the game operation begins or the time at which the game is updated. For example, the usable time of a character X includes January 2015, which is when the character X was added due to the start of game operation.

The lottery game information 50C is stored for each lottery game in association with the lottery game ID of that lottery game. This lottery game information 50C includes, for example, the name (title), an image, lottery target information, and the price. The lottery target information includes the character IDs of the characters constituting the lottery target character group, which is the lottery target of the lottery game, and the lottery probability associated with those character IDs. The "lottery target" includes a plurality of characters with different usable times. The lottery probability is set lower for a character of high rarity, and higher for a character of low rarity. In this lottery probability, a character (pickup character) with a higher lottery probability than other characters of the same rarity may be provided. The price includes the number of items (consumption amount) required to execute one lottery.

The quest information 50D is stored for each quest in association with the quest ID of that quest. The quest information 50D includes, for example, the name (title), an image, appearing character information, consumption stamina value, a clearance condition, reward information, executable time, and prioritization time. Appearing character information includes parameters (level, hit points, etc.) of enemy characters appearing in the quest. A consumption stamina value is the stamina value required to execute a quest. The clearance condition includes the clear standard of the quest. Examples of clearance conditions include reducing the hit points of all enemy characters to zero or less, occupying an enemy character's territory, and so on. The reward information includes information related to rewards granted to the player when the quest has been cleared. The reward information includes, for example, the character IDs of characters that are rewards, the grant level of those characters, the granting rate (drop rate), which is the probability that these characters will be granted, the number of game coins, the amount of player experience value, and the number of free items. The executable time includes the time at which the quest became executable, that is, the time at which the quest was added. This time is, for example, the time at which the game operation was started, or the time at which the game was updated. For example, the executable time of a quest E includes March of 2015, which is when the quest E was added by the first update since the start of game operation. Also, for example, the executable time of a quest G includes December of 2015, which is when the quest G was added by the fifth update since the start of game operation. Also, for example, the executable time of a quest R includes April of 2018, which is when the quest R was added by the 25th update since the start of game operation. The prioritization time includes a specific time for prioritization of a reward. In one or more embodiments, if the usable time of a used character in a quest is before the specific time, the reward for that quest is prioritized. For example, the prioritization time (specific time) of the quest E includes March of 2015, which is the same as the executable time of the quest E. Also, for example, the prioritization time of the quest G includes May of 2016, which is six months after the executable time of the quest G. Also, for example, the prioritization time of the quest R includes April of 2017, which is one year before the executable time of the quest R.

The decision means 52 is a functional means for deciding on the used characters (used content) to be used by the player in the quest. In one or more embodiments, the decision means 52 decides on the used characters in one quest, which is an existing quest, from among one or more characters associated with the player. For instance, the decision means 52 decides on, as used characters, a specific number (such as three) of characters selected by the player from among the possessed characters. In addition to characters possessed by the player, characters associated with the player include characters possessed by other players registered as friends by the player, and characters loaned out to the player by the game manager, etc.

The execution means 54 is a functional means for executing a quest based on an execution instruction (request) from the player. In the first one or more embodiments, the execution means 54 executes a quest selected by the player based on the parameters of the used characters decided on by the decision means 52.

The determination means 56 is a functional means for making various kinds of determinations. In one or more embodiments, the determination means 56 determines whether or not the used characters decided on by the decision means 52 satisfy a specific condition. This specific condition is, for example, whether or not a used character is an existing character that became usable before the prioritization time (specific time) corresponding to the quest. More specifically, the determination means 56 refers to the usable time of the character information 50B and the prioritization time of the quest information 50D, and gives a positive determination if the usable time of the used character is before the prioritization time corresponding to one quest.

The granting means 58 is a functional means for granting a reward to the player. In one or more embodiments, the granting means 58 grants a reward to the player in response to satisfying the clearance condition in a quest executed by the execution means 54. This reward includes, for example, free items (free stones and free gacha tickets) and characters. The granting means 58 refers to the reward information of the quest information 50D and grants a character according to the character granting rate (drop rate). Examples of this character include a character that became usable before the prioritization time (specific time) of one quest, and a character that became usable after the prioritization time.

Also, when the used character decided on by the decision means 52 satisfies a specific condition, the granting means 58 prioritizes the reward for a quest. For example, if the determination means 56 determines that some or all of the used characters are existing characters that became usable before the prioritization time (specific time) of a quest, the granting means 58 prioritizes the reward of that quest.

Specific examples in which the granting means 58 prioritizes rewards will now be given. These specific examples may be combined with each other.

(1) Including a New Character in the Reward

For example, the granting means 58 performs prioritization to include in the reward any new character that became usable in an update after the prioritization time (specific time) of one executed quest. More specifically, if some or all of the used characters are existing characters, the granting means 58 uses the characters added after the prioritization time as rewards. On the other hand, if some or all of the used characters are not existing characters, the granting means 58 uses the characters added before the prioritization time of the executed quest as rewards.

(2) Including in the Reward the Right to Execute a Lottery Game in which a New Character is the Lottery Target For example, the granting means 58 performs prioritization to include in the reward the right to execute a lottery game (such as a free stone or a free gacha ticket) in which a new character that became usable in an update after the prioritization time (specific time) of the executed quest is included. More specifically, if some or all of the used characters are existing characters, the granting means 58 adds to the reward the right to execute a lottery game in which characters added after the prioritization time are some or all of the lottery targets. On the other hand, if some or all of the used characters are not existing characters, the granting means 58 does not add the right to execute a lottery game to the reward.

(3) Strengthening Parameters of Characters that are Rewards

For example, the granting means 58 performs prioritization to strengthen parameters of characters that are rewards. More specifically, if all of the used characters are existing characters, the granting means 58 increases the level of a character that is a reward to 99, which is the upper limit value, and grants this to the player On the other hand, if none of the used characters are existing characters, the granting means 58 reduces the level of a character that is a reward to 1, which is the initial value, and grants this to the player If some or all of the used characters are existing characters, the granting means 58 may increase the upper limit value of the level of characters that are rewards and grant this to the player.

(4) Evolving a Character that is a Reward

For example, the granting means 58 performs prioritization to evolve characters that are rewards. More specifically, if some of the used characters are existing characters, the granting means 58 transforms a character that is a reward into an evolved character and grants this to the player. On the other hand, if none of the used characters are existing characters, the granting means 58 grants a character that is a reward to the player without any change.

(5) Increasing the Amount of Reward

For example, the granting means 58 performs prioritization to increase the amount of the reward. More specifically, if some or all of the used characters are existing characters, the granting means 58 grants five free items that are rewards. On the other hand, if some or all of the characters used are not existing characters, the granting means 58 grants just one item that is a reward.

(6) Increasing the Granting Rate of Characters that are Rewards

For example, the granting means 58 performs prioritization to increase the granting rate (drop rate) of characters that are rewards. More specifically, if all of the used characters are existing characters, the granting means 58 increases the granting rate of characters that are rewards from 50% to 100%. On the other hand, if none of the used characters are existing characters, the granting means 58 leaves the granting rate of characters that are rewards at 50%.

Also, the more the used characters decided on by the decision means 52 includes existing characters that became usable before the prioritization time (specific time) of a quest, the more the granting means 58 prioritizes the rewards. More specifically, if one or none of three used characters is an existing character, the granting means 58 grants one free item that is a reward. If two of the three used characters are existing characters, the granting means 58 grants five free items that are rewards. If all three of the used characters are existing characters, the granting means 58 grants ten free items that are rewards.

Processing Flow

Figure 5:
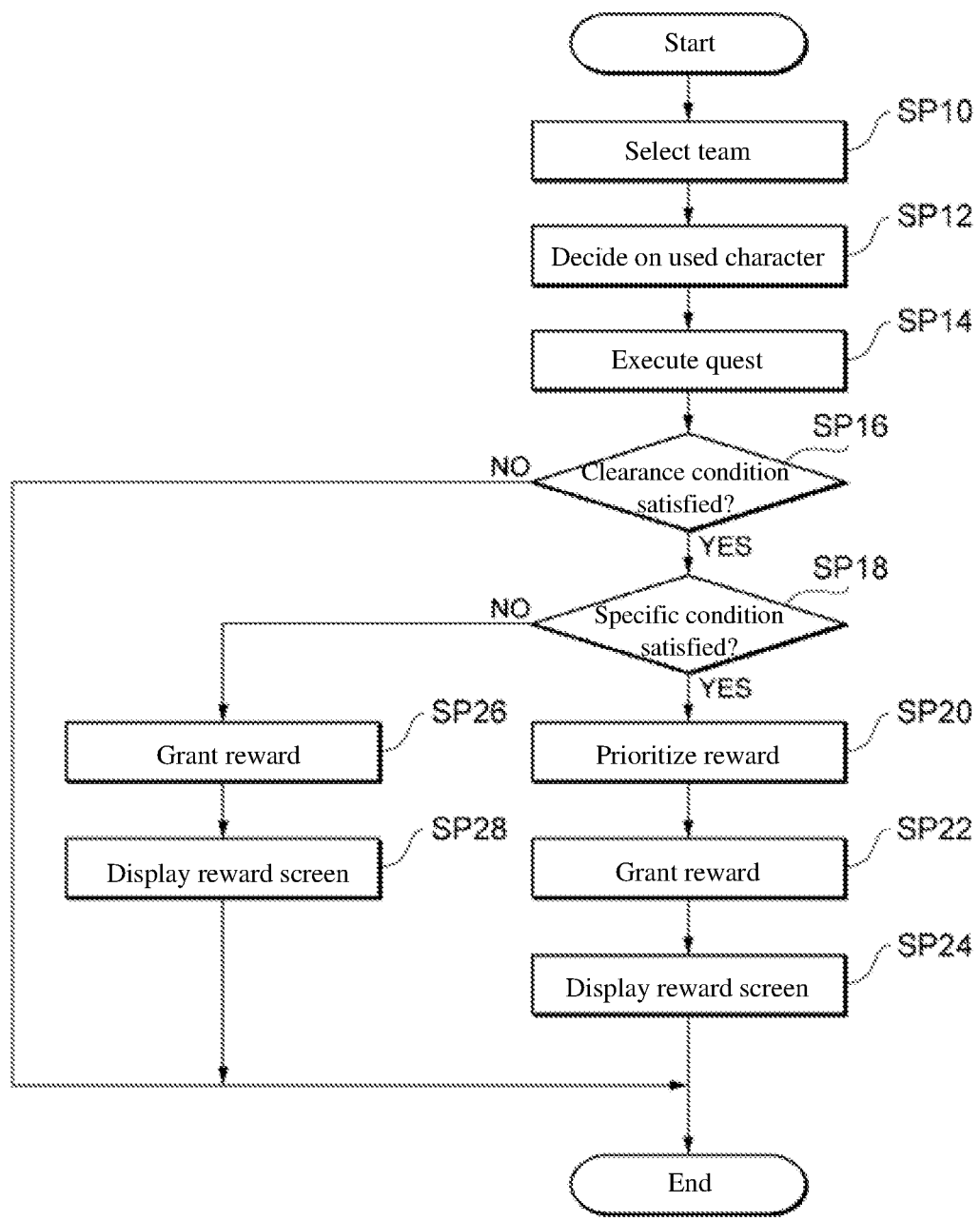
FIG. 5 is a flowchart showing an example of the flow of processing performed by the functional means shown in FIG. 4 in the game system according to one or more embodiments.

FIG. 5 is a flowchart showing an example of the flow of processing performed by the functional means shown in FIG. 4 in the game system according to one or more embodiments. Also, the processing of the following steps is started, for example, at the point when the player has selected a quest that is an existing quest from among a plurality of types of quest on the quest menu screen displayed on the touch panel 32. The order of the following steps, and the details thereof, can be changed as needed.

Step SP10

The execution means 54 displays on the touch panel 32 a selection screen 60 for selecting a team to be used in a quest.

Figure 6:
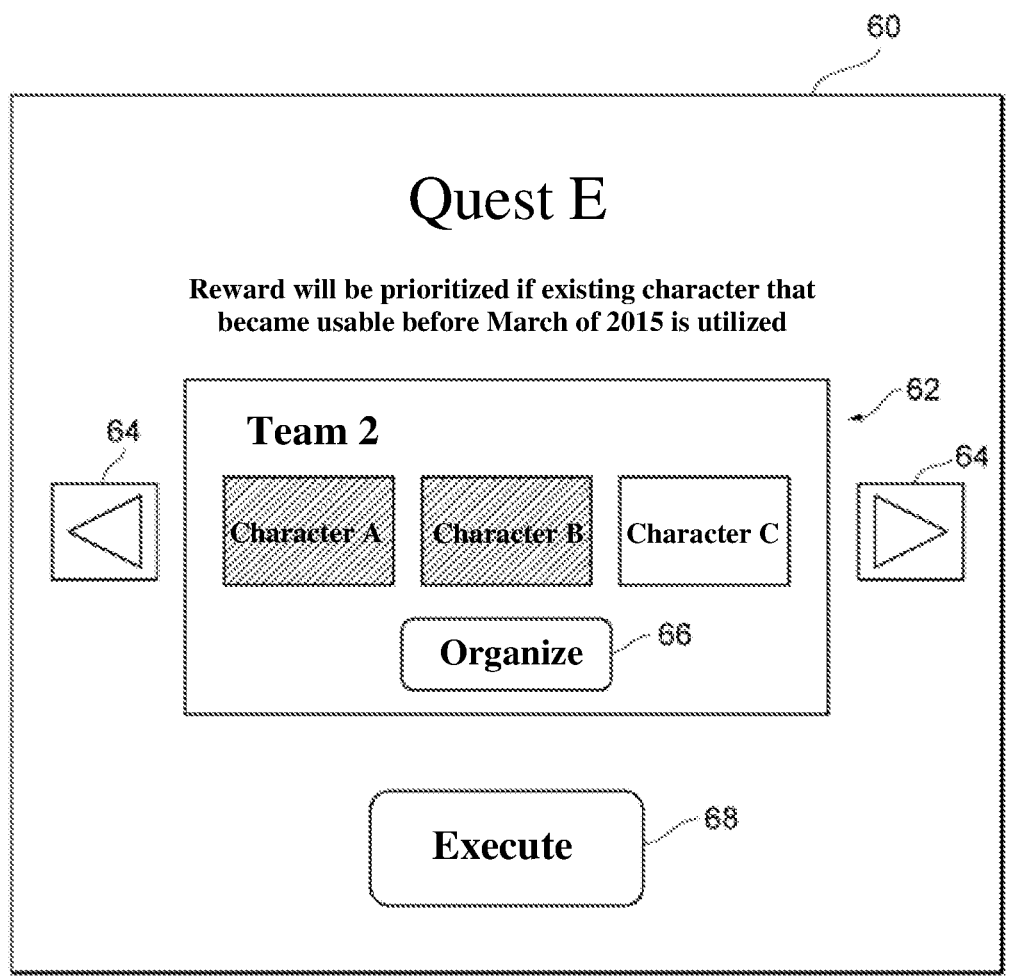
FIG. 6 is a diagram showing an example of a selection screen according to one or more embodiments.

FIG. 6 is a diagram showing an example of the selection screen 60 according to one or more embodiments.

As shown in FIG. 6, the selection screen 60 is provided with a team information area 62, a team switching button 64, an organization button 66, and an execution button 68. The selection screen 60 indicates a reward is prioritized when an existing character that became usable before the prioritization time (specific time) of a quest is used. In the team information area 62 is shown a team organized ahead of time by the player. In the team information area 62, possessed characters that became usable before the prioritization time (specific time) of a quest and possessed characters that became usable after the prioritization time are displayed in different formats within the team. For example, possessed characters that became usable after the prioritization time are grayed out. The team switching button 64 is used for issuing an instruction to switch the team displayed in the team information area 62 to another team organized ahead of time by the player. The organization button 66 is used for issuing an instruction to organize (reorganize) the team shown in the team information area 62. When the organization button 66 is pressed, the screen transitions to a list of the characters possessed by the player, and the player can organize (reorganize) a specific number (such as three) or less of the characters possessed by the player into the team indicated in the team information area 62. In this list screen of possessed characters, those possessed characters that became usable before the prioritization time for a quest and those possessed characters that became usable after the prioritization time may be displayed in different formats. The execute button 68 is used for issuing an instruction to execute a quest with the team shown in the team information area 62.

Returning to FIG. 5, the processing moves to the processing of step SP12.

Step SP12

When the player presses the execution button, the decision means 52 decides on the possessed characters included in the team shown in the team information area, as used characters to be used in a quest. The processing then moves to the processing of step SP14.

Step SP14

The execution means 54 executes a quest based on the parameters of the used character decided on in step SP12. For instance, the execution means 54 executes a battle game using the parameters of the decided-on used characters and the parameters of enemy characters appearing in a quest. Then, the processing moves to the processing of step SP16.

Step SP16

The determination means 56 determines whether or not a clearance condition has been satisfied in a quest. For example, if the hit points of all enemy characters drop to zero or less, the determination means 56 gives a positive determination. On the other hand, if the hit points of all the used characters is zero or less, the determination means 56 gives a negative determination. Then, if the determination is positive, the processing moves to the processing of step SP18. On the other hand, if the determination is negative, the series of processing shown in FIG. 5 is ended.

Step SP18

The determination means 56 determines whether or not the used character satisfies a specific condition. For example, the determination means 56 refers to the character information 50B and the quest information 50D, and gives a positive determination if the usable time of all (three) of the usable characters is before the prioritization time (specific time) corresponding to one quest. If the determination is positive, the processing moves to the processing of step SP20. On the other hand, if the determination is negative, the processing moves to the processing of step SP26.

Step SP20

The granting means 58 refers to the quest information 50D, acquires the number of free items included in the reward information, and increases that number. More specifically, the granting means 58 performs prioritization to increase the number of free items that are rewards from one to five. The processing then moves to the processing of step SP22.

Step SP22

The granting means 58 grants the player the rewards prioritized in step SP20. More specifically, the granting means 58 grants the player the free items whose number was increased in step SP20, characters included in the reward information of the quest information 50D, and the like, and updates the possessed item information, the possessed character information, and so forth of the player information 50A. The processing then moves to the processing of step SP24.

Step SP24

The execution means 54 displays on the touch panel 32 a reward screen 70 showing the rewards granted in step SP22.

Figure 7:
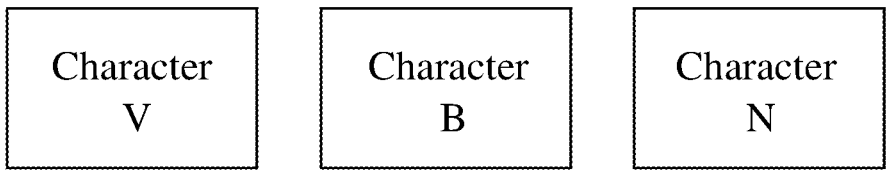
FIG. 7 is a diagram showing an example of a reward screen when the reward has been prioritized according to one or more embodiments.

FIG. 7 is a diagram showing an example of the reward screen 70 when the reward has been prioritized according to one or more embodiments.

As shown in FIG. 7, the reward screen 70 is provided with a reward information area 72. The reward information area 72 shows the rewards granted to the player for clearing a quest. In the reward information area 72, it is shown that the rewards were prioritized as a result of using characters (existing characters) that became usable before the prioritization time (specific time) of a quest.

Then, the series of processing shown in FIG. 5 is ended.

Step SP26

The granting means 58 grants a normal reward to the player. More specifically, the granting means 58 grants the player free items, characters, and so forth included in the reward information of the quest information 50D, and updates the possessed item information, the possessed character information, and so forth of the player information 50A. The processing then moves to the processing of step SP28.

Step SP28

The execution means 54 displays on the touch panel 32 a reward screen 80 showing the rewards granted in step SP26.

Figure 8:
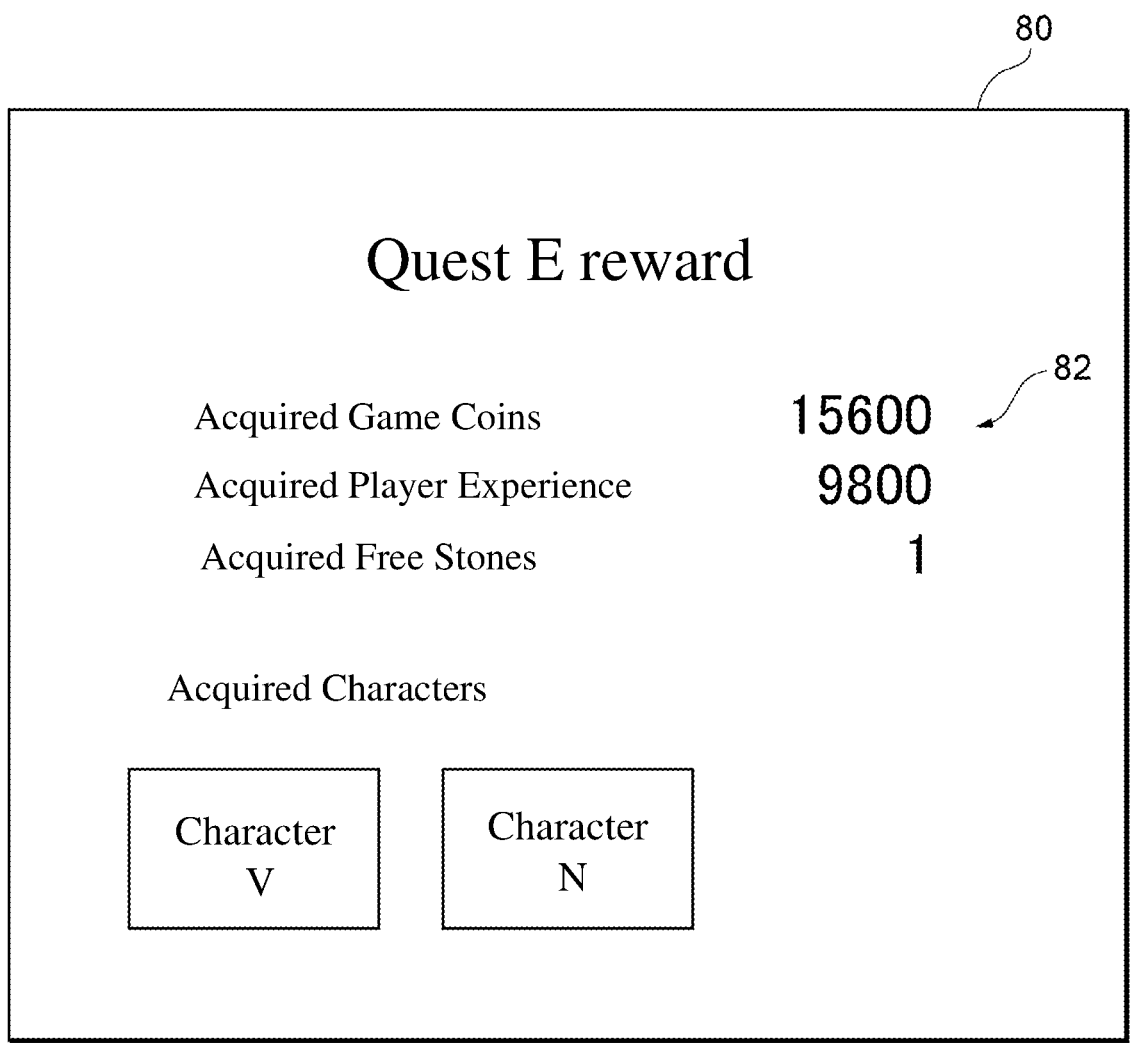
FIG. 8 is a diagram showing an example of a reward screen when a normal reward is granted according to one or more embodiments.

FIG. 8 is a diagram showing an example of the reward screen 80 when a normal reward is granted according to one or more embodiments.

As shown in FIG. 8, the reward screen 80 is provided with a reward information area 82. The reward information area 82 shows a normal reward granted to the player by clearing a quest.

The series of processing shown in FIG. 5 is then ended.

Effect

As described above, in one or more embodiments, instructions for executing a game in which a new quest can be executed based on an update that adds the new quest to existing quests, and new content becomes usable based on an update that adds the new content to existing content, cause a computer to function as a decision means 52 for deciding on the used content to be used in one quest, which is an existing quest, from among the content associated with a player; an execution means 54 for executing the one quest based on the parameters of the used content; and a granting means 58 for granting a reward to the player in response to satisfying a clearance condition in the executed one quest, wherein the granting means prioritizes the reward when the used content is existing content that became usable before a specific time corresponding to the one quest.

With this configuration, when existing content is utilized as the used content, the rewards in an existing quest will be prioritized, and this motivates the player to utilize existing content in that existing quest. Consequently, existing content will be utilized more frequently in existing quests. Also, when the used content is existing content, it will not be so simple for the player to clear the existing quest, which makes the existing quest more interesting. Furthermore, even if the player acquires existing content in a lottery game in which new content is the featured content, for example, the player can utilize the acquired existing content in an existing quest.

Also, in one or more embodiments, the decision means 52 decides on a plurality of sets of content as used content from among the content associated with the player, and the granting means 58 prioritizes a reward if some or all of the used content is existing content that became usable before a specific time.

With this configuration, when some or all of the used content is existing content, the reward in an existing quest will be prioritized, and this motivates the player to utilize existing content in that existing quest.

Also, in one or more embodiments, the decision means 52 decides on a plurality of sets of content as used content from among the content associated with the player, and the more the used content includes existing content that became usable before the specific time, the more the granting means 58 prioritizes the reward.

With this configuration, the more the used content includes existing content, the more the reward will be prioritized in an existing quest, and this motivates the player to utilize more existing content in that existing quest.

Also, in one or more embodiments, the prioritization is for the reward to include new content that became usable after a specific time.

With this configuration, new content will be granted when existing content is utilized as the used content, this motivates the player to utilize the granted new content in a new quest. This makes the overall game more lively.

Also, in one or more embodiments, the prioritization is for the reward to include the right to execute a lottery game in which new content that became usable after the specific time is included in the lottery.

With this configuration, the right to execute a lottery game in which new content is included as the lottery target will be granted when existing content is utilized as the used content, and this motivates the player to utilize the new content acquired in that lottery game in a new quest. This makes the overall game more lively.

Also, in one or more embodiments, the prioritization is to strengthen a parameter of the content that is the reward.

With this configuration, content whose parameters are strengthened will be granted when existing content is utilized as the used content, and this motivates the player to utilize existing content in an existing quest.

Also, in one or more embodiments, the prioritization is to evolve the content that is the reward.

With this configuration, evolved content will be granted when existing content is utilized as the used content, and this motivates the player to utilize existing content in an existing quest.

Also, in one or more embodiments, the prioritization is to increase the amount of the reward.

With this configuration, the amount of the reward increases when existing content is utilized as the used content, and this motivates the player to utilize existing content in an existing quest.

Also, in one or more embodiments, the prioritization is to increase the probability of granting the content that is the reward.

With this configuration, the probability of granting the content that is the reward will increase when existing content is utilized as the used content, and this motivates the player to utilize existing content in an existing quest.

Also, in one or more embodiments, the reward is existing content that became usable before the specific time.

With this configuration, existing content in which the reward is prioritized will be granted as a reward, and this motivates the player to utilize the granted existing content in an existing quest.

Also, in one or more embodiments, the specific time is the time at which a quest was added.

With this configuration, the reward will be prioritized when the used content is existing content that became usable before the time at which an existing quest was added. Therefore, even if the player has not played a game for a long time, the player can be motivated to utilize the existing content associated with the player in an existing quest. Also, utilizing existing content as the used content allows the player to play the game at the same level of interest as when the existing quest was first added.

Second Example

A second example will now be described.

The second example differs from the first example, for example, in that a quest executed by the execution means 54 is a new quest. The components and functions of the game system according to the second example that are not described below are the same as those of the game system according to the first example.

Specific Example 1

In one or more embodiments, the decision means 52 decides on a used character to be used in a quest that is a new quest from among one or more characters associated with the player.

Also, in one or more embodiments, the execution means 54 lowers the degree of difficulty of a quest that is a new quest when the used character decided on by the decision means 52 satisfies a specific condition. For instance, if the determination means 56 has determined that some or all of the used characters are existing characters that became usable before the prioritization time (specific time) of a quest, the execution means 54 lower the degree of difficulty of the quest. More specifically, the execution means 54 reduces the number of enemy characters appearing in the quest.

Also, the more existing characters that became usable before the prioritization time (specific time) of a quest that is a new quest that are included in the used characters decided on by the decision means 52, the more the execution means 54 lowers the degree of difficulty of the quest. More specifically, the execution means 54 does not change the level of the enemy characters appearing in a quest when one or none of the three used characters is an existing character. Also, the execution means 54 reduces the level of the enemy characters appearing in a quest by 10 when there are two existing characters among the three used characters. Also, the execution means 54 reduces the level of the enemy characters appearing in a quest by 20 when all of the used characters are existing characters.

Flow of Processing

Figure 9:
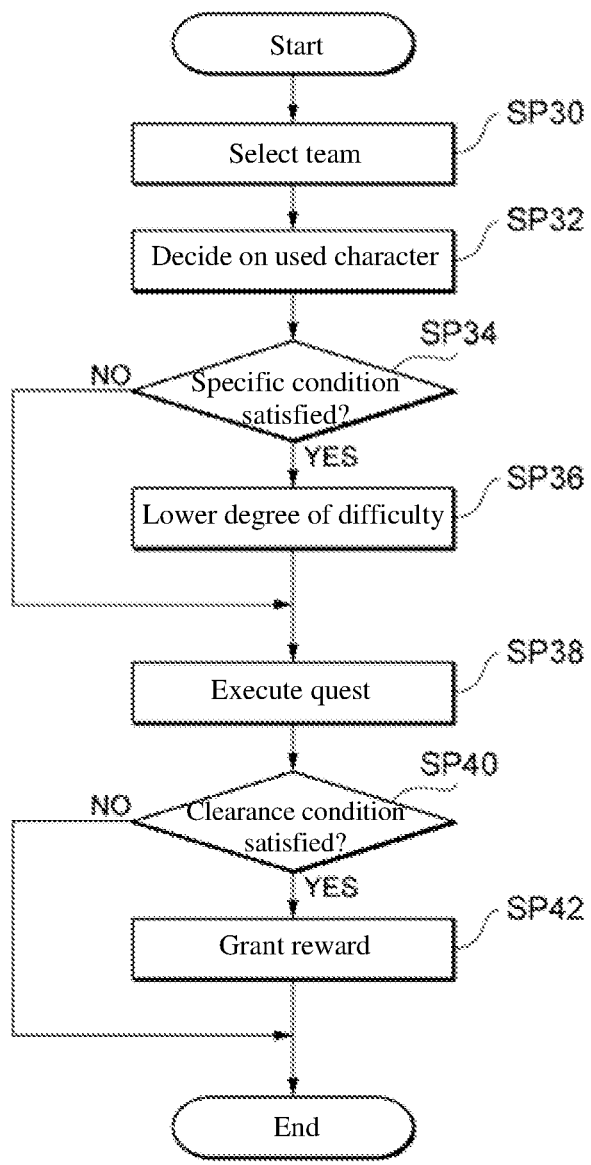
FIG. 9 is a flowchart showing an example of the flow of processing performed by the functional units shown in FIG. 4 in the game system according to one or more embodiments.

FIG. 9 is a flowchart showing an example of the flow of processing performed by the functional means shown in FIG. 4 in the game system according to one or more embodiments. On the quest menu screen displayed on the touch panel 32, a quest that is a new quest is begun at the point when the player selects a quest from a plurality of types of quest. The order of the following steps, and the details thereof, can be changed as needed.

Step SP30 to step SP32

The processing in steps SP30 to SP32 is the same as the processing in steps SP10 to SP12 described above, and therefore will not be described again.

Step SP34

The determination means 56 determines whether or not the used character satisfies a specific condition. For example, the determination means 56 refers to the character information 50B and the quest information 50D, and gives a positive determination if the usable time of one or more of the three used characters is before the prioritization time (specific time) corresponding to a quest. If the determination is positive, the processing moves to the processing of step SP36. On the other hand, if the determination is negative, the processing moves to the processing of step SP38.

Step SP36

The execution means 54 lowers the degree of difficulty of a quest. For example, the execution means 54 reduces the number of enemy characters appearing in the quest. The processing then moves to the processing of step SP38.

Step SP38

The execution means 54 executes a quest based on the parameters of the used character determined in step SP32. For example, the execution means 54 executes a battle game using the parameters of a decided-on used character and the parameters of enemy characters appearing in a quest. The processing then moves to the processing of step SP40.

Step SP40

The determination means 56 determines whether or not a clearance condition has been satisfied in a quest. For example, the determination means 56 gives a positive determination when a team composed of used characters has occupied an enemy character's territory. On the other hand, the determination means 56 gives a negative determination when an enemy character occupies the territory of the team composed of the used characters. If this determination is positive, the processing moves to the processing of step SP42. On the other hand, if the determination is negative, the series of processing shown in FIG. 9 is ended.

Step SP42

The granting means 58 grants the player rewards. More specifically, the granting means 58 grants the player free items, characters, etc., included in the reward information of the quest information 50D, and updates the possessed item information, the possessed character information, etc., of the player information 50A. The series of processing shown in FIG. 9 is then ended.

Specific Example 2

In specific example 1 given above, in step SP36 the execution means 54 lowered the degree of difficulty of a quest that is a new quest, but the granting means 58 may prioritize the rewards of that quest. For example, the more the used characters includes existing characters that became usable before the prioritization time (specific time), the more the granting means 58 prioritizes the reward. Similar to the prioritization described in one or more embodiments, examples of this prioritization include increasing the amount of a reward, increasing the probability of granting a character (content) that is a reward (granting rate), and the like.

Effect

In one or more embodiments, instructions for executing a game in which a new quest can be executed based on an update that adds the new quest to existing quests, and new content becomes usable based on an update that adds the new content to existing content, cause a computer to function as a decision means 52 for deciding on the used content to be used in one quest, which is a new quest, from among the content associated with a player; an execution means 54 for executing the one quest based on the parameters of the used content; and a granting means 58 for granting a reward to the player in response to satisfying a clearance condition in the executed one quest, wherein the execution means 54 lowers the degree of difficulty of the quest when the used content is existing content that became usable before a specific time corresponding to the quest.

With this configuration, when existing content is utilized as the used content, the degree of difficulty of the new quest will be lowered, and this motivates the player to utilize existing content in the new quest. Consequently, existing content will be utilized more frequently in new quests. Also, even if the player has not played the game for a long time, the player can be motivated to utilize existing content associated with the player in a new quest. Furthermore, even if the player acquires existing content in a lottery game or the like in which new content is the featured content, the player can utilize the acquired existing content in a new quest.

Further, in one or more embodiments, the decision means 52 decides on a plurality of sets of content as used content from among the content associated with the player, and the execution means 54 lowers the degree of difficulty of a quest if some or all of the used content is existing content that became usable before a specific time.

With this configuration, when some or all of the used content is existing content, the degree of difficulty of the new quest will be lowered, and this motivates the player to utilize existing content in a new quest.

Also, in one or more embodiments, the decision means 52 decides on a plurality of sets of content as used content from among the content associated with the player, and the more the used content includes existing content that became usable before the specific time, the more the execution means 54 lowers the degree of difficulty of a quest.

With this configuration, the more the used content includes existing content, the degree of difficulty of the new quest will be lowered, and this motivates the player to utilize more existing content in that new quest.

Also, in one or more embodiments, instructions for executing a game in which a new quest can be executed based on an update that adds the new quest to existing quests, and new content becomes usable based on an update that adds the new content to existing content, cause a computer to function as a decision means 52 for deciding on the used content to be used in one quest, which is a new quest, from among the content associated with a player; an execution means 54 for executing the one quest based on the parameters of the used content; and a granting means 58 for granting a reward to the player in response to satisfying a clearance condition in the executed one quest, wherein the granting means 58 prioritizes the reward when the used content is existing content that became usable before a specific time corresponding to the one quest.

With this configuration, when existing content is utilized as the used content, the rewards in a new quest will be prioritized, and this motivates the player to utilize existing content in that new quest. Consequently, existing content will be utilized more frequently in new quests. Also, even if the player has not played the game for a long time, the player can be motivated to utilize the existing content associated with the player in a new quest. Furthermore, even if the player acquires existing content in a lottery game or the like in which new content is the featured content, the player can utilize the acquired existing content in a new quest.

Also, in one or more embodiments, the decision means 52 decides on a plurality of sets of content as used content from among the content associated with the player, and the granting means 58 prioritizes a reward if some or all of the used content is existing content that became usable before a specific time.

With this configuration, when some or all of the used content is existing content, the reward in a new quest will be prioritized, and this motivates the player to utilize existing content in that new quest.

Also, in one or more embodiments, the decision means 52 decides on a plurality of sets of content as used content from among the content associated with the player, and the more the used content includes existing content that became usable before the specific time, the more the granting means 58 prioritizes the reward.

With this configuration, the more the used content includes existing content, the more the reward will be prioritized in a new quest, and this motivates the player to utilize more existing content in that new quest.

Also, in one or more embodiments, the prioritization is to increase the amount of the reward.

With this configuration, when existing content is utilized as the used content, the amount of the reward increases, and this motivates the player to utilize existing content in a new quest.

Also, in one or more embodiments, the prioritization is to increase the probability of granting the content that is the reward.

With this configuration, when existing content is utilized as the used content, the probability of granting the content that is the reward will be increased, and this motivates the player to utilize existing content in a new quest.

Also, in one or more embodiments, the reward is content that became usable before a specific time.

With this configuration, since existing content in which the degree of difficulty and the reward are prioritized will be granted as the reward, this motivates the player to utilize the granted existing content in a new quest.

Also, in one or more embodiments, the specific time is the time at which a quest was added.

With this configuration, the degree of difficulty and the reward will be prioritized when the used content is existing content that became usable before the time at which a new quest was added. Therefore, even if the player has not played a game for a long time, the player can be motivated to utilize the existing content associated with the player in a new quest.

Third Example

A third example will now be described.

The third example differs from the first example, for example, in that the execution means 54 increases the degree of difficulty of a quest that is an existing quest. The components and functions of the game system according to the third example that are not described below are the same as those of the game systems according to the first and second examples.

Specific Example 1

In one or more embodiments, the determination means 56 determines whether or not the used character decided on by the decision means 52 satisfies a specific condition. This specific condition is, for example, whether or not the used character is a new character that became usable after the prioritization time (specific time) corresponding to a quest.

Also, in one or more embodiments, the execution means 54 increases the degree of difficulty of a quest that is an existing quest when the used character decided on by the decision means 52 satisfies a specific condition. For example, if the determination means 56 has determined that some or all of the used characters are new characters that became usable after the prioritization time (specific time) for a quest, the execution means 54 increases the degree of difficulty of the quest. More specifically, the execution means 54 increases the number of enemy characters appearing in the quest.

Also, the more the used characters decided on by the decision means 52 includes new characters that became usable after the prioritization time (specific time) of a quest that is an existing quest, the more the execution means 54 increases the degree of difficulty of the quest. More specifically, the execution means 54 does not change the level of the enemy characters appearing in a quest when one or none of the three used characters is a new character. Also, the execution means 54 increases the level of the enemy characters appearing in a quest by 10 when there are two new characters among the three used characters. Also, the execution means 54 increases the level of the enemy characters appearing in a quest by 20 when all of the used characters are new characters.

Flow of Processing

Figure 10:
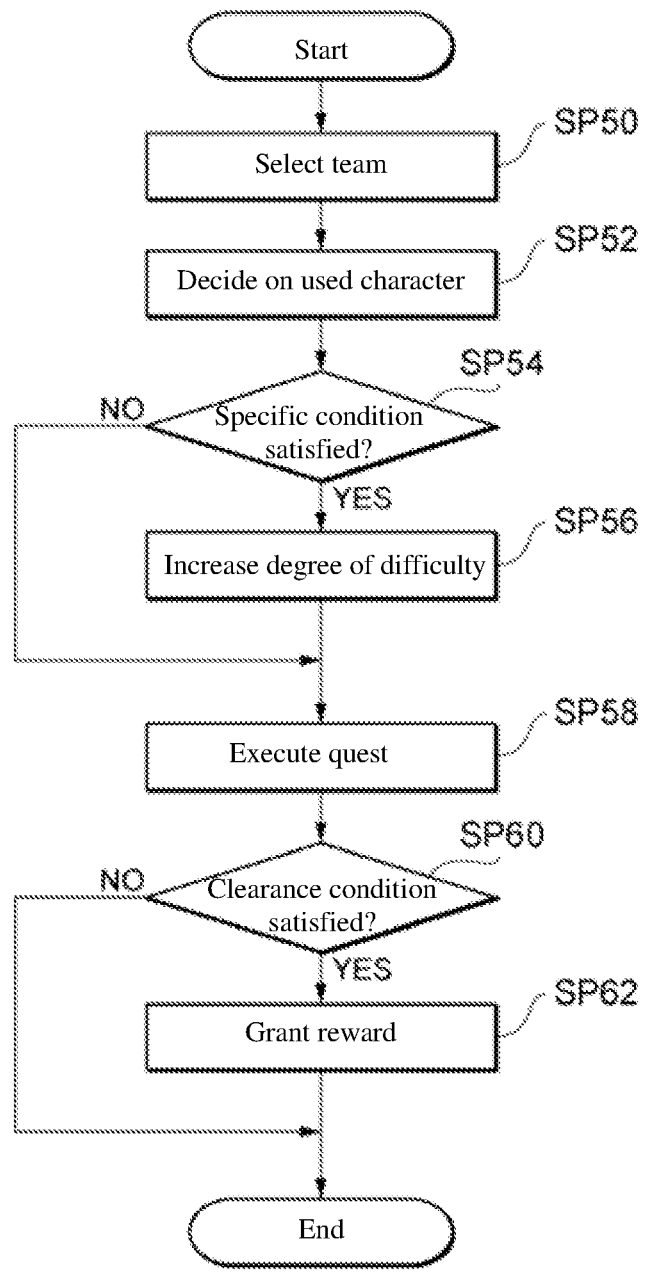
FIG. 10 is a flowchart showing an example of the flow of processing performed by the functional means shown in FIG. 4 in the game system according to one or more embodiments.

FIG. 10 is a flowchart showing an example of the flow of processing performed by the functional means shown in FIG. 4 in the game system according to one or more embodiments. On the quest menu screen displayed on the touch panel 32, a quest that is an existing quest is begun at the point when the player selects a quest from a plurality of types of quest. The order of the following steps, and the details thereof, can be changed as needed.

Step SP50 to Step SP52

The processing in steps SP50 to SP52 is the same as the processing in steps SP30 to SP32 described above, and therefore will not be described again.

Step SP54

The determination means 56 determines whether or not the used character satisfies a specific condition. For example, the determination means 56 refers to the character information 50B and the quest information 50D, and gives a positive determination if the usable time of two or more of the three used characters is after the prioritization time (specific time) corresponding to a quest. If the determination is positive, the processing moves to the processing of step SP56. On the other hand, if the determination is negative, the processing moves to the processing of step SP58.

Step SP56

The execution means 54 increases the degree of difficulty of a quest. For example, the execution means 54 increases the number of enemy characters appearing in the quest. The processing then moves to the processing of step SP58.

Step SP58 to Step SP62

Since the processing in steps SP58 to SP62 is the same as the processing in steps SP38 to SP42 described above, it will not be described again. The series of processing shown in FIG. 10 is then ended.

Specific Example 2

In specific example 1 given above, the execution means 54 increases the degree of difficulty of one quest that is an existing quest in step SP56, but the granting means 58 may deprioritize the rewards of that quest. For example, the more the used content includes new characters that became usable after the prioritization time (specific time), the more the granting means 58 deprioritizes the reward. Examples of this deprioritization include reducing the amount of the reward, lowering the probability of granting a character (content) that is a reward (granting rate), and the like.

Effect

In one or more embodiments, instructions for executing a game in which a new quest can be executed based on an update that adds the new quest to existing quests, and new content becomes usable based on an update that adds the new content to existing content, cause a computer to function as a decision means 52 for deciding on the used content to be used in one quest, which is an existing quest, from among the content associated with a player; an execution means 54 for executing the one quest based on the parameters of the used content; and a granting means 58 for granting a reward to the player in response to satisfying a clearance condition in the executed one quest, wherein the execution means 54 increases the degree of difficulty of the quest when the used content is new content that became usable after a specific time corresponding to the quest.

With this configuration, when new content is utilized as the used content, the degree of difficulty of an existing quest will be increased, and this motivates the player to utilize existing content in the existing quest. Consequently, existing content will be utilized more frequently in existing quests. Also, even if the player has not played the game for a long time, the player can be motivated to utilize existing content associated with the player in an existing quest. Furthermore, even if the player acquires existing content in a lottery game or the like in which new content is the featured content, the player can utilize the acquired existing content in an existing quest.

Also, in one or more embodiments, the decision means 52 decides on a plurality of sets of content as used content from among the content associated with the player, and the execution means 54 increases the degree of difficulty of a quest if some or all of the used content is new content that became usable after a specific time.

With this configuration, when some or all of the used content is new content, the degree of difficulty of an existing quest will be higher, and this motivates the player to utilize existing content in an existing quest.

Also, in one or more embodiments, the decision means 52 decides on a plurality of sets of content as used content from among the content associated with the player, and the more the used content includes new content that became usable after the specific time, the more the execution means 54 increases the degree of difficulty of a quest.

With this configuration, the more the used content includes new content, the higher the degree of difficulty of the existing quest will be, and this motivates the player to utilize more existing content in the existing quest.

Also, in one or more embodiments, instructions for executing a game in which a new quest can be executed based on an update that adds the new quest to existing quests, and new content becomes usable based on an update that adds the new content to existing content, cause a computer to function as a decision means 52 for deciding on the used content to be used in one quest, which is an existing quest, from among the content associated with a player; an execution means 54 for executing the one quest based on the parameters of the used content; and a granting means 58 for granting a reward to the player in response to satisfying a clearance condition in the executed one quest, wherein the granting means 58 deprioritizes the reward when the used content is existing content that became usable after a specific time corresponding to the one quest.

With this configuration, when new content is utilized as the used content, the rewards in an existing quest will be deprioritized, and this motivates the player to utilize existing content in that existing quest. Consequently, existing content will be utilized more frequently in existing quests. Also, even if the player has not played the game for a long time, the player can be motivated to utilize the existing content associated with the player in an existing quest. Furthermore, even if the player acquires existing content in a lottery game or the like in which new content is the featured content, the player can utilize the acquired existing content in an existing quest.

Also, in one or more embodiments, the decision means 52 decides on a plurality of sets of content as used content from among the content associated with the player, and the granting means 58 deprioritizes a reward if some or all of the used content is new content that became usable after a specific time.

With this configuration, when some or all of the used content is new content, the reward in an existing quest will be deprioritized, and this motivates the player to utilize existing content in that existing quest.

Also, in one or more embodiments, the decision means 52 decides on a plurality of sets of content as used content from among the content associated with the player, and the more the used content includes new content that became usable after the specific time, the more the granting means 58 deprioritizes the reward.

With this configuration, the more the used content includes new content, the more the reward will be deprioritized in an existing quest, and this motivates the player to utilize more existing content in that existing quest.

Also, in one or more embodiments, the deprioritization is to decrease the amount of the reward.

With this configuration, when new content is utilized as the used content, the amount of the reward will decrease, and this motivates the player to utilize existing content in an existing quest.

Also, in one or more embodiments, the deprioritization is to decrease the probability of granting the content that is the reward.

With this configuration, when new content is utilized as the used content, the probability of granting the content that is the reward will decrease, and this motivates the player to utilize existing content in an existing quest.

Also, in one or more embodiments, the reward is existing content that became usable before a specific time.

With this configuration, since existing content in which the degree of difficulty and the reward are not deprioritized will be granted as the reward, this motivates the player to utilize the granted existing content in an existing quest.

Also, in one or more embodiments, the specific time is the time at which a quest was added.

With this configuration, the degree of difficulty and the reward will be deprioritized when the used content is new content that became usable after the time at which an existing quest was added. Therefore, even if the player has not played a game for a long time, the player can be motivated to utilize the existing content associated with the player in an existing quest. Also, utilizing existing content allows the player to play the game at the same level of interest as when the existing quest was first added.

Modification Examples

The present invention is not limited to or by the above specific examples. That is, suitable design changes made by a person skilled in the art to the above specific examples are also encompassed by in the scope of the present invention as long as they still have the features of the present invention. Also, the elements of the embodiments described above and the modified example (discussed below) can be combined to the extent that this is technically possible, and these combinations are also encompassed by the scope of the present invention as long as they still have the features of the present invention.

For example, in the first example, an example was given in which the usable time in the character information 50B, the executable time in the quest information 50D, and the prioritization time (specific time) were stored in the format of "month and year," but may instead be stored in the format of "year," "day, month, and year," version number, or the like.

Also, in the first example, an example was given in which the prioritization time (specific time) was stored for each quest in the quest information 50D, but the prioritization time common to some or all quests may be stored instead. For example, January of 2017 may be stored as a common prioritization time for each of the quests whose executable time is from January to December of 2017.

Also, in the first example, an example was given in which the execution means 54 executed a quest based on the parameters of the used characters, but the used characters may be limited to characters that became usable after the prioritization time of the quest. For example, the execution means 54 prohibits execution of a quest when some or all of the used characters in the quest are characters that became usable after the prioritization time.

Also, in the second example, an example was given in which the more the used characters includes existing characters, the more the execution means 54 lowered the degree of difficulty in a quest, but instead of this, the degree of difficulty may be lowered the older is the time at which a used character became usable. For example, the execution means 54 compares the usable time of a used character with the prioritization time (specific time) in a quest, and if this usable time is at least one year before the prioritization time, the number of enemy characters that appear is reduced by 15%. Also, the execution means 54 reduces the number of enemy characters that appear by 30% when this usable time is at least two years before the prioritization time. Similarly, in the third example, an example was given in which the more the used characters includes new characters, the more the execution means 54 increased the degree of difficulty of a quest, but instead of this, the degree of difficulty may be increased the more recent is the time at which a used character became usable.

Also, in the first example and the second example, an example was given in which the more the used characters includes existing characters, the more the granting means 58 prioritized the reward in a quest, but instead of this, rewards may be prioritized the older is the time at which a used character became usable. For example, the granting means 58 compares the usable time of a used character with the prioritization time (specific time) in a quest, and if this usable time is at least one year before the prioritization time, one free item that is a reward is added. Also, if the usable time is at least two years before the prioritization time, the granting means 58 adds two free items that are a reward.

Also, when some or all of the used characters are existing characters that became usable before the prioritization time (specific time) in a quest, the granting means 58 may designate a character that is a reward a character of high rarity. More specifically, when some or all of the used characters are existing characters, the granting means 58 uses characters with a rarity of 5 as a reward. On the other hand, if some or all of the used characters are not existing characters, the granting means 58 uses characters with a rarity of 4 as a reward.

Also, in the third example, an example was given in which the more the used characters includes new characters, the more the granting means 58 deprioritized the rewards in a quest, but instead of this, the more recent is the time at which a used character became usable, the more the rewards may be deprioritized.

Also, when some or all of the used characters are new characters that became usable after the prioritization time (specific time) in a quest, the granting means 58 may designate a character that is a reward a character of low rarity. More specifically, when some or all of the used characters are new characters, the granting means 58 uses characters with a rarity of 4 as a reward. On the other hand, if some or all of the used characters are not new characters, the granting means 58 uses characters with a rarity of 5 as a reward.

Also, in the second example and the third example, an example was given in which the execution means 54 increased or decreased the number and level of enemy characters appearing in a quest to vary the degree of difficulty of a quest, but the degree of difficulty may instead be varied by changing the number and type of gimmicks that appear in a quest, the encounter rate with enemy characters, the parameters and skills of the used characters, the number of possible continuations, clearance conditions, and so forth. Changes to the clearance conditions include changing the number of occupied territories of enemy characters, increasing or decreasing the time limit, and the like.

Also, in the first to third examples, an example was given in which the content was mainly characters, but the content may instead be items such as weapons and armor, tools, cards, avatars, coins, points, and so forth.

Other Examples

Other examples will now be described.

In a conventional game, updates (version upgrades, etc.) are continually being made to add new quests or new content and keep the player from becoming bored, but the parameters and the like of existing content were often lower than those of new content, so this existing content ended up being used less often in quests. Furthermore, new quests often have higher degree of difficulty than existing quests, and a player may not be motivated to utilize existing content in these new quests.

Other Example 1 is intended to provide instructions and an information processing device with which the frequency at which existing content is utilized in a new quest can be increased.

The instructions according to one or more embodiments execute a game in which a new quest can be executed based on an update that adds the new quest to existing quests, and new content becomes usable based on an update that adds the new content to existing content. The instructions cause a computer to function as: a decision means for deciding on the used content to be used in one quest, which is a new quest, from among the content associated with a player; an execution means for executing the one quest based on the parameters of the used content; and a granting means for granting a reward to the player in response to satisfying a clearance condition in the executed one quest, wherein the execution means lowers the degree of difficulty of the quest when the used content is existing content that became usable before a specific time corresponding to the quest.

Also, in one or more embodiments of the Other Example 1, the decision means decides on a plurality of sets of content as the used content from among the content associated with the player, and the execution means lowers the degree of difficulty of the quest when some or all of the used content is existing content that became usable before the specific time.

Also, in one or more embodiments of the Other Example 1, the decision means decides on a plurality of sets of content as the used content from among the content associated with the player, and the more the used content includes existing content that became usable before the specific time, the more the execution means lowers the degree of difficulty of the quest.

Also, instructions according to one or more embodiments of the Other Example 1 execute a game in which a new quest can be executed based on an update that adds the new quest to existing quests, and new content becomes usable based on an update that adds the new content to existing content. The instructions cause a computer to function as: a decision means for deciding on the used content to be used in one quest, which is a new quest, from among the content associated with a player; an execution means for executing the one quest based on the parameters of the used content; and a granting means for granting a reward to the player in response to satisfying a clearance condition in the executed one quest, wherein the granting means prioritizes the reward when the used content is existing content that became usable before a specific time corresponding to the one quest.

Also, in one or more embodiments of the Other Example 1, the decision means decides on a plurality of sets of content as the used content from among the content associated with the player, and the granting means prioritizes the reward if some or all of the used content is existing content that became usable before the specific time.

Also, in one or more embodiments of the Other Example 1, the decision means decides on a plurality of sets of content as the used content from among the content associated with the player, and the more the used content includes existing content that became usable before the specific time, the more the granting means prioritizes the reward.

Also in one or more embodiments of the Other Example 1, the prioritization is to increase the amount of the reward.

Also, in one or more embodiments of the Other Example 1, the prioritization is to increase the probability of granting the content that is the reward.

Also, in one or more embodiments of the Other Example 1, the reward is content that became usable before the specific time.

Also, in one or more embodiments of the Other Example 1, the specific time is the time at which the one quest was added.

Also, the information processing device according to one or more embodiments of the Other Example 1 is an information processing device for executing a game in which a new quest can be executed based on an update that adds the new quest to existing quests, and new content becomes usable based on an update that adds the new content to existing content, the information processing device comprising: a decision means for deciding on the used content to be used in one quest, which is a new quest, from among the content associated with a player; an execution means for executing the one quest based on the parameters of the used content; and a granting means for granting a reward to the player in response to satisfying a clearance condition in the executed one quest, wherein the execution means lowers the degree of difficulty of the quest if the used content is existing content that became usable before a specific time corresponding to the quest.

Also, the information processing device according to one or more embodiments of the Other Example 1 is an information processing device for executing a game in which a new quest can be executed based on an update that adds the new quest to existing quests, and new content becomes usable based on an update that adds the new content to existing content, the information processing device comprising: a decision means for deciding on the used content to be used in one quest, which is a new quest, from among the content associated with a player; an execution means for executing the one quest based on the parameters of the used content; and a granting means for granting a reward to the player in response to satisfying a clearance condition in the executed one quest, wherein the granting means prioritizes the reward when the used content is existing content that became usable before a specific time corresponding to the one quest.

With the Other Example 1, existing content can be utilized more frequently in a new quest.

Also, existing content often has lower parameters and the like than new content, and ends up being used less often in quests. In particular, existing quests often have a lower degree of difficulty than new quests, and such quests are easily cleared by using new content.

The instructions according to one or more embodiments of the Other Example 2 execute a game in which a new quest can be executed based on an update that adds the new quest to existing quests, and new content becomes usable based on an update that adds the new content to existing content The instructions cause a computer to function as: a decision means for deciding on the used content to be used in one quest, which is an existing quest, from among the content associated with a player; an execution means for executing the one quest based on the parameters of the used content; and a granting means for granting a reward to the player in response to satisfying a clearance condition in the executed one quest, wherein the execution means increases the degree of difficulty of the quest when the used content is new content that became usable after a specific time corresponding to the quest.

Also, in one or more embodiments of the Other Example 2, the decision means decides on a plurality of sets of content as the used content from among the content associated with the player, and the execution means increases the degree of difficulty of the quest when some or all of the used content is new content that became usable after the specific time.

Also, in one or more embodiments of the Other Example 2, the decision means decides on a plurality of sets of content as the used content from among the content associated with the player, and the more the used content includes new content that became usable after the specific time, the more the execution means increases the degree of difficulty of the quest.

Also, the instructions according to one or more embodiments of the Other Example 2 execute a game in which a new quest can be executed based on an update that adds the new quest to existing quests, and new content becomes usable based on an update that adds the new content to existing content. The instructions cause a computer to function as: a decision means for deciding on the used content to be used in one quest, which is an existing quest, from among the content associated with a player; an execution means for executing the one quest based on the parameters of the used content; and a granting means for granting a reward to the player in response to satisfying a clearance condition in the executed one quest, wherein the granting means deprioritizes the reward when the used content is new content that became usable after a specific time corresponding to the one quest.

Also, in one or more embodiments of the Other Example 2, the decision means decides on a plurality of sets of content as the used content from among the content associated with the player, and the granting means deprioritizes the reward if some or all of the used content is new content that became usable after the specific time.

Also, in one or more embodiments of the Other Example 2, the decision means decides on a plurality of sets of content as the used content from among the content associated with the player, and the more the used content includes new content that became usable after the specific time, the more the granting means deprioritizes the reward.

Also in one or more embodiments of the Other Example 2, the deprioritization is to decrease the amount of the reward.

Also, in one or more embodiments of the Other Example 2, the deprioritization is to decrease the probability of granting the content that is the reward.

Also, in one or more embodiments of the Other Example 2, the reward is new content that became usable after the specific time.

Also, in one or more embodiments of the Other Example 2, the specific time is the time at which the one quest was added.

Also, the information processing device according to one or more embodiments of the Other Example 2 is an information processing device for executing a game in which a new quest can be executed based on an update that adds the new quest to existing quests, and new content becomes usable based on an update that adds the new content to existing content, the information processing device comprising: a decision means for deciding on the used content to be used in one quest, which is an existing quest, from among the content associated with a player; an execution means for executing the one quest based on the parameters of the used content; and a granting means for granting a reward to the player in response to satisfying a clearance condition in the executed one quest, wherein the execution means increases the degree of difficulty of the quest if the used content is new content that became usable after a specific time corresponding to the quest.

Also, the information processing device according to one or more embodiments of the Other Example 2 is an information processing device for executing a game in which a new quest can be executed based on an update that adds the new quest to existing quests, and new content becomes usable based on an update that adds the new content to existing content, said device comprising: a decision means for deciding on the used content to be used in one quest, which is an existing quest, from among the content associated with a player; an execution means for executing the one quest based on the parameters of the used content; and a granting means for granting a reward to the player in response to satisfying a clearance condition in the executed one quest, wherein the granting means deprioritizes the reward when the used content is new content that became usable after a specific time corresponding to the one quest.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage means, 52 . . . decision means, 54 . . . execution means, 58 . . . granting means

What is claimed is:

1. A non-transitory computer readable medium storing a program for executing a game in which a new quest can be executed based on an update that adds the new quest to an existing quest, and a new content becomes usable based on an update that adds the new content to an existing content, the program causing a computer to:

decide a used content to be used in one quest, which is the existing quest, from contents associated with a player;

execute the one quest based on a parameter of the used content;

grant a reward to the player in response to satisfying a clearance condition in the executed one quest; and prioritize the reward when a usable time of the used content is earlier than a specific time stored in association with the one quest.

2. The non-transitory computer readable medium according to claim 1, wherein the computer:

decides a plurality of contents as the used content from the contents associated with the player, and prioritizes the reward when a part or all of the used content is the existing content that became usable before the specific time.

3. The non-transitory computer readable medium according to claim 1, wherein the computer decides a plurality of contents as the used content from the contents associated with the player, and the more the used content includes the existing content that became usable before the specific time, the more the computer prioritizes the reward.

4. The non-transitory computer readable medium according to claim 1, wherein prioritization is for the reward to include a new content that became usable on or after the specific time.

5. The non-transitory computer readable medium according to claim 1, wherein prioritization is for the reward to include a right to execute a lottery game in which a new content that became usable on or after the specific time is included in a lottery.

6. The non-transitory computer readable medium according to claim 1, wherein prioritization is to strengthen a parameter of a content that is the reward.

7. The non-transitory computer readable medium according to claim 1, wherein prioritization is to evolve a content that is the reward.

8. The non-transitory computer readable medium according to claim 1, wherein prioritization is to increase an amount of the reward.

9. The non-transitory computer readable medium according to claim 1, wherein prioritization is to increase a probability of granting a content that is the reward.

10. An information processing device for executing a game in which a new quest can be executed based on an update that adds the new quest to an existing quest, and a new content becomes usable based on an update that adds the new content to an existing content, the information processing device comprising:

a central processing unit (CPU) that:

decides a used content to be used in one quest, which is the existing quest, from contents associated with a player;

executes the one quest based on a parameter of the used content;

grants a reward to the player in response to satisfying a clearance condition in the executed one quest; and prioritizes the reward when a usable time of the used content is earlier than a specific time stored in association with the one quest.

* * * * *